(12) United States Patent
Ito et al.

(10) Patent No.: US 9,903,449 B2
(45) Date of Patent: Feb. 27, 2018

(54) TOROIDAL CONTINUOUSLY VARIABLE TRANSMISSION

(71) Applicant: NSK LTD., Tokyo (JP)

(72) Inventors: Yasuo Ito, Fujisawa (JP); Hiroki Nishii, Fujisawa (JP)

(73) Assignee: NSK LTD., Tokyo (JP)

( * ) Notice: Subject to any disclaimer, the term of this patent is extended or adjusted under 35 U.S.C. 154(b) by 234 days.

(21) Appl. No.: 14/775,114

(22) PCT Filed: Feb. 7, 2014

(86) PCT No.: PCT/JP2014/052867
§ 371 (c)(1),
(2) Date: Sep. 11, 2015

(87) PCT Pub. No.: WO2014/148139
PCT Pub. Date: Sep. 25, 2014

(65) Prior Publication Data
US 2016/0025194 A1 Jan. 28, 2016

(30) Foreign Application Priority Data
Mar. 18, 2013 (JP) ................................ 2013-054558

(51) Int. Cl.
*F16H 15/38* (2006.01)

(52) U.S. Cl.
CPC ....... *F16H 15/38* (2013.01); *F16H 2015/383* (2013.01)

(58) Field of Classification Search
CPC ..................................................... F16H 15/38
(Continued)

(56) References Cited

U.S. PATENT DOCUMENTS

| 6,659,907 B2* | 12/2003 | Hirano | F16H 15/38 476/40 |
| 2011/0182542 A1* | 7/2011 | Brown | F16C 19/30 384/620 |
| 2013/0102436 A1 | 4/2013 | Toyoda et al. | |

FOREIGN PATENT DOCUMENTS

| JP | 06-307514 | * 11/1994 |
| JP | 2001-116097 | * 4/2001 |

(Continued)

OTHER PUBLICATIONS

International Search Report for PCT/JP2014/052867 dated Apr. 8, 2014 [PCT/ISA/210].

(Continued)

*Primary Examiner* — William C Joyce
(74) *Attorney, Agent, or Firm* — Sughrue Mion, PLLC

(57) ABSTRACT

Provided is a toroidal continuously variable transmission capable of preventing the application of bending stress to a variator shaft during rotation and the application of an eccentric load to each of support parts even when misalignment between the axis of a fitting hole formed in a post and the axis on which the variator shaft is supported occurs.

A thrust bearing 12 which determines the position of an output side disc 10 in an axial direction and rotatably supports the output side disc 10 is fitted into a fitting hole 62b provided in a post 61, and a predetermined gap S is provided between the thrust bearing 12 and the fitting hole 62b in a direction perpendicular to the variator shaft 3. Therefore, even when misalignment between the axis of the fitting hole and the axis on which the variator shaft is supported occurs, the axes of the thrust bearing 12 and the variator shaft 3 can be aligned with each other in the predetermined gap S, thereby preventing the application of (Continued)

bending stress to the variator shaft 3 during rotation and the application of an eccentric load to each of support parts.

4 Claims, 5 Drawing Sheets

(58) Field of Classification Search
USPC .............................................. 476/40, 42, 46
See application file for complete search history.

(56) References Cited

FOREIGN PATENT DOCUMENTS

| JP | 2004-84712 A | 3/2004 |
|---|---|---|
| JP | 2004-257533 A | 9/2004 |
| JP | 2005-299752 A | 10/2005 |
| JP | 2006-2791 A | 1/2006 |
| JP | 2007-170592 A | 7/2007 |
| JP | 2008-64139 A | 3/2008 |
| JP | 2009-174573 A | 8/2009 |
| JP | 2012-193845 A | 10/2012 |

OTHER PUBLICATIONS

Written Opinion issued by the International Bureau in corresponding International Application No. PCT/JP2014/052867, dated Apr. 8, 2014.

* cited by examiner

[Fig. 1]
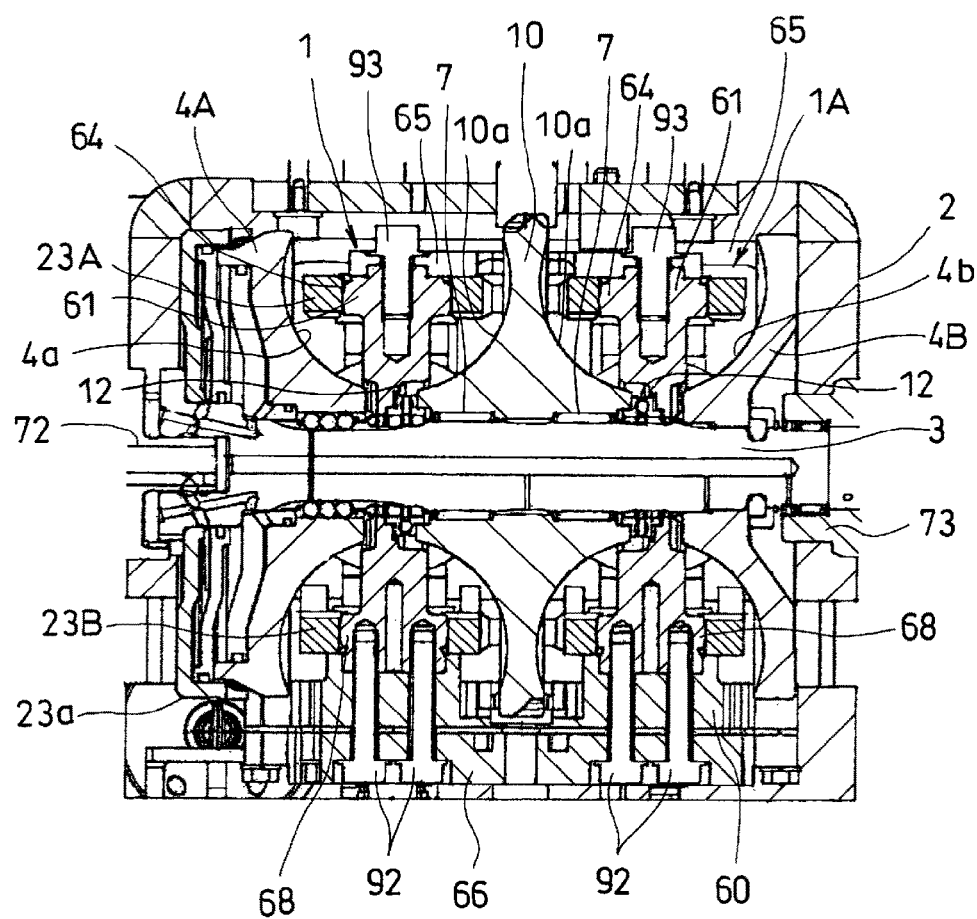

[Fig. 2]
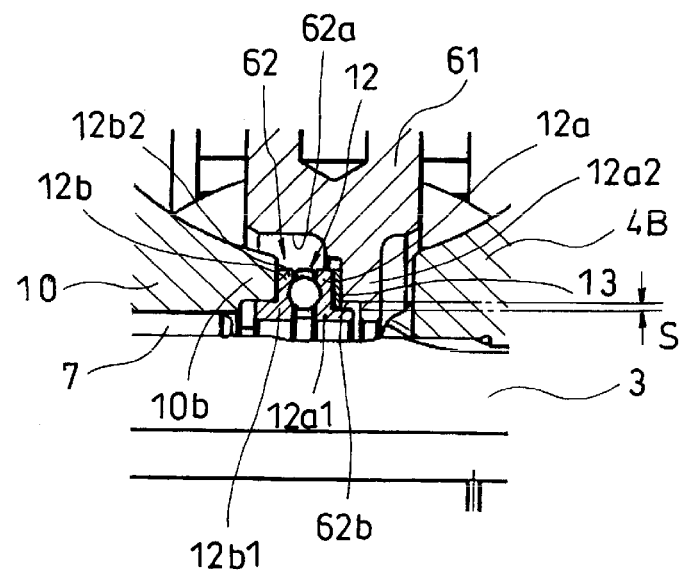
[Fig. 3]
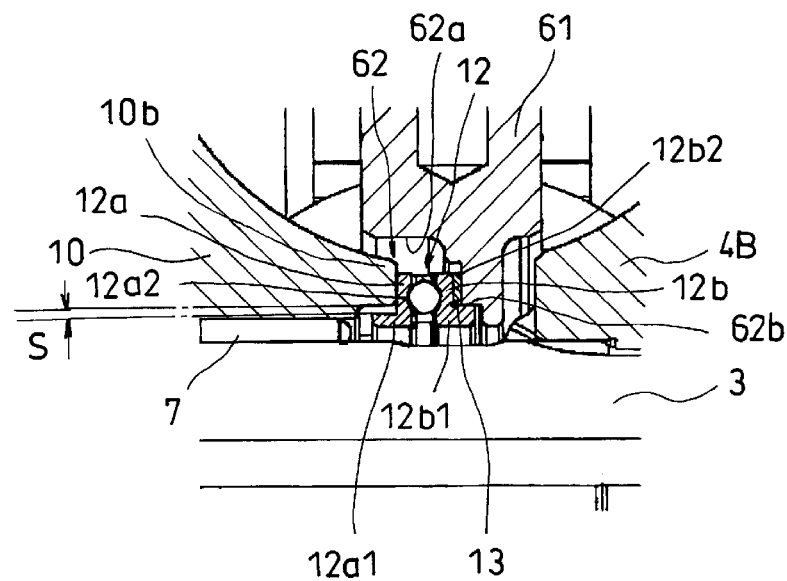

[Fig. 4]   PRIOR ART
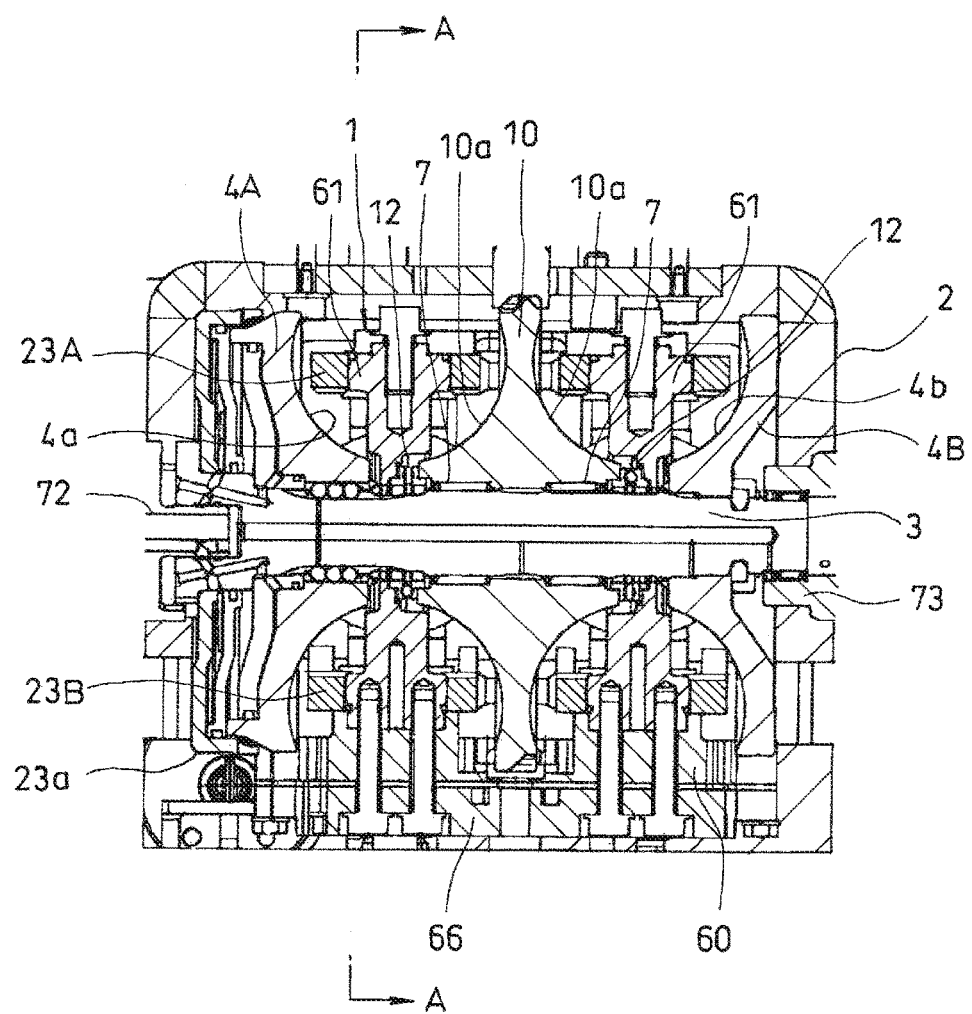

[Fig. 5] PRIOR ART
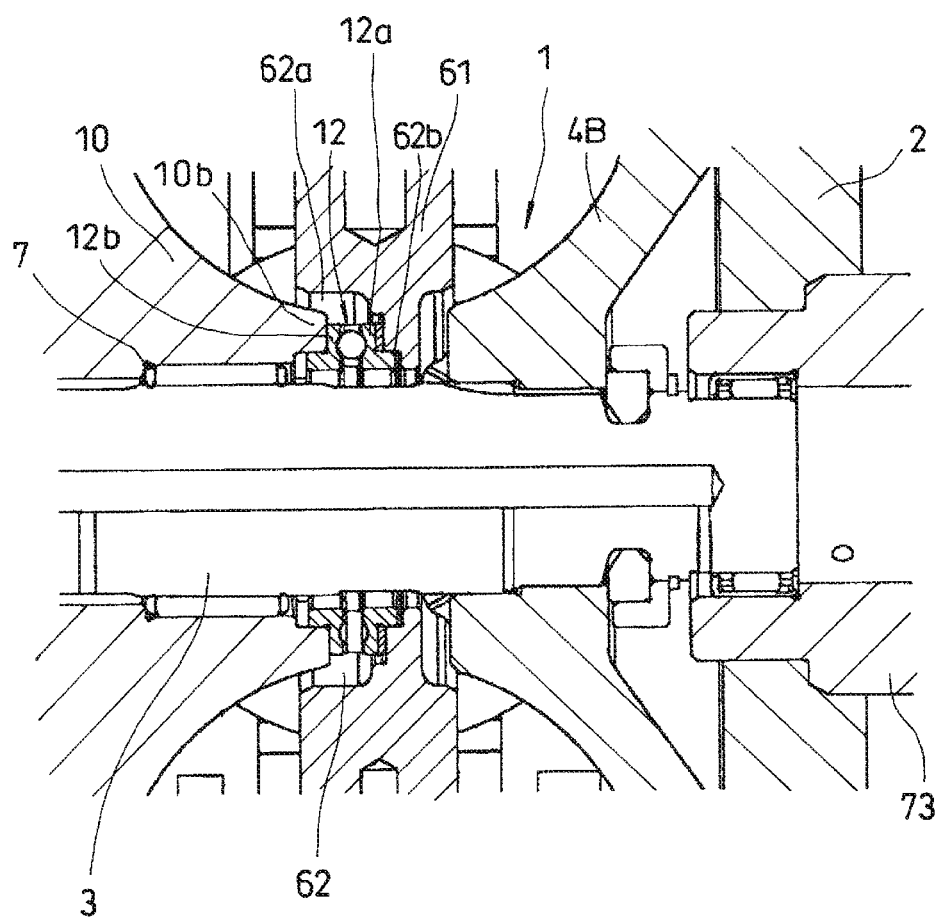

[Fig. 6] PRIOR ART
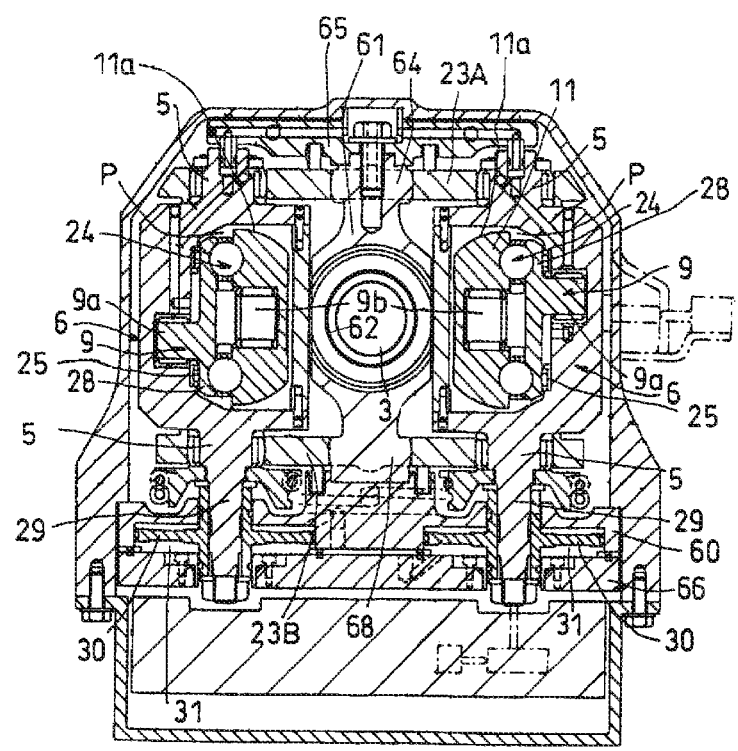

TOROIDAL CONTINUOUSLY VARIABLE TRANSMISSION

CROSS REFERENCE TO RELATED APPLICATIONS

This application is a National Stage of International Application No. PCT/JP2014/052867, filed on Feb. 7, 2014, which claims priority from Japanese Patent Application No. 2013-054558, filed on Mar. 18, 2013, the contents of all of which are incorporated herein by reference in their entirety.

TECHNICAL FIELD

The present invention relates to a toroidal continuously variable transmission which can be used in a transmission or the like of a vehicle or various industrial machines.

BACKGROUND ART

FIG. 4 is a sectional view illustrating an existing double cavity-type toroidal continuously variable transmission used as a transmission for a vehicle, and FIG. 5 is an enlarged sectional view of the main parts thereof. This toroidal continuously variable transmission 1 is assembled into a casing 2.

The toroidal continuously variable transmission 1 includes input side discs 4A and 4B which are provided in the periphery of an input shaft (variator shaft) 3 to rotate along with the input shaft 3 and are supported to be displaced in the axial direction of the input shaft 3, and an integrated type output side disc 10 which are rotatably supported. A radial bearing 7 is interposed between the output side disc 10 and the input shaft 3, and the position of the output side disc 10 in the axial direction is determined by thrust bearings 12 and 12 provided at both end portions thereof in the axial direction. In addition, the output side disc 10 is rotatably supported by the radial bearing 7 and the thrust bearings 12.

As illustrated in FIG. 6, in the casing 2 in which the toroidal continuously variable transmission 1 is stored, a pair of trunnions 6 and 6 which oscillate about pivots (tilt axes) 5 and 5 which are provided at positions where they twist with respect to the input shaft 3 are provided. Each of the trunnions 6 has a concave pocket portion P, and a power roller 11 is accommodated in the pocket portion P.

A circular hole is formed in the trunnion 6, and a base end portion 9a of a displacement shaft 9 is supported in the circular hole. In addition, by allowing the trunnions 6 and 6 to respectively oscillate about the pivots 5 and 5, the tilt angles of the displacement shafts 9 respectively supported by the center portions of the trunnions 6 and 6 can be controlled. In the periphery of a tip end portion 9b of the displacement shaft 9 which protrudes from the inner surface of each of the trunnions 6 and 6, the power roller 11 is rotatably supported, and the power rollers 11 and 11 are respectively interposed between the input side discs 4A and 4B and the output side disc 10. The base end portion 9a and the tip end portion 9b of each of the displacement shafts 9 and 9 are mutually eccentric.

Both end portions of the pair of trunnions 6 and 6 are supported to be displaced in the axial direction (up and down direction in FIG. 6) while being able to oscillate with respect to a pair of yokes 23A and 23B. The yokes 23A and 23B are supported by a pair of posts 61 and 61. That is, the post 61 is a support provided perpendicular to the input shaft 3 in the casing 2, and the upper yoke 23A is supported to be displaced by a spherical post 64 of the post 61 and a connection plate 65 which supports the spherical post 64. The lower post 23B is supported to be displaced by a spherical post 68 of the post 61 and an upper cylinder body 60 which supports the spherical post 68.

The input shaft 3 is inserted through the center portion of the post 61. That is, as illustrated in FIGS. 5 and 6, an insertion hole 62 is formed in the center portion of the post 61. The insertion hole 62 includes a large-diameter hole 62a, and a fitting hole 62b which has a smaller diameter than the large-diameter hole 62a.

In addition, the thrust bearing 12 is inserted through the insertion hole 62, and one bearing ring 12a of the thrust bearing 12 is fitted into the fitting hole 62b. An end portion 10b of the output side disc 10 is inserted through the large-diameter hole 62a of the insertion hole 62, and the other bearing ring 12b of the thrust bearing 12 inserted through the large-diameter hole 62a is fitted to the end portion 10b.

Accordingly, the input shaft 3 is inserted through the inside of the thrust bearing 12 fitted in the post 61, and a predetermined gap is formed between the input shaft 3 and the inner peripheral surface of the thrust bearing 12.

As illustrated in FIG. 6, between the outer surface of each of the power rollers 11 and 11 and each of the trunnions 6 and 6, a thrust ball bearing 24 and a thrust needle bearing 25 are provided in order from the outer surface of the power roller 11. Among these, the thrust ball bearing 24 allows the rotation of the corresponding power roller 11 while withstanding a load in the thrust direction applied to the power roller 11.

In addition, the thrust needle bearing 25 allows the oscillation and displacement of the corresponding power roller 11 and an outer race 28 about the base end portion 9a of the corresponding displacement shaft 9 while withstanding a thrust load applied from the power roller 11 to the outer race 28.

Furthermore, in one end portion (lower end portion in FIG. 6) of each of the trunnions 6 and 6, a driving rod (trunnion shaft) 29 is provided, and a driving piston (hydraulic piston) 30 is fixed to the outer peripheral surface of the intermediate portion of each of the driving rods 29. Each of the driving pistons 30 is oil-tightly embedded in a driving cylinder 31 to form a hydraulic driving device. In this case, the driving cylinder (cylinder body) 31 is formed by the upper cylinder body 60 and a lower cylinder body 66.

In addition, as illustrated in FIG. 4, a crankshaft of an engine which is a driving source (not illustrated) is joined to the base end portion (left end portion in FIG. 4) of the input shaft 3 via a driving shaft 72, and the tip end portion (right end portion in FIG. 4) of the input shaft 3 is rotatably supported by a bearing 73 provided in the casing 2. The input shaft 3 is rotatingly driven by the crankshaft via the driving shaft 72.

In addition, hydraulic pressing devices 23a for applying appropriate surface pressures to rolling contact portions (traction portions) between inner surfaces 4a and 4b of both the input side discs 4A and 4B, both side surfaces (inner surfaces) 10a and 10a of the output side disc 10 in the axial direction, and an peripheral surface 11a of each of the power rollers 11 and 11 are used. Pressure oil can be supplied by an oil pump (not illustrated) to the pressing devices 23a and the driving cylinders 31 for displacing the trunnions 6 and 6 to change the speed.

In the toroidal continuously variable transmission 1 assembled in such a continuously variable transmission, in the case of changing the ratio of the rotational speeds of the input shaft 3 and the output side disc 10, the pair of driving pistons 30 and 30 are displaced in the opposite directions to each other. As the driving pistons 30 and 30 are displaced, the pair of trunnions 6 and 6 are displaced in the opposite directions to each other. As a result, the directions of forces in the normal direction exerted on the contact portions between the peripheral surfaces 11a and 11a of the power rollers 11 and 11, the inner surfaces 4a and 4b of the input side discs 4A and 4B, and both side surfaces 10a and 10a of the output side disc 10 in the axial direction are changed. As the directions of the forces are changed, the trunnions 6 and 6 respectively oscillate in the opposite directions to each other about the pivots 5 and 5 pivotally supported on the yokes 23A and 23B.

As a result, the contact positions between the peripheral surfaces 11a and 11a of the power rollers 11 and 11 and the inner surfaces 4a, 4b, and 10a are changed such that the ratio of the rotational speeds of the input shaft 3 and the output side disc 10 is changed. When the torque transmitted between the input shaft 3 and the output side disc 10 is changed and thus the elastic deformation amount of each of the constituent members is changed, the power rollers 11 and 11 and the outer races 28 attached to the power rollers 11 slightly rotate about the base end portions 9a of the corresponding displacement shafts 9. Since the thrust needle bearing 25 is present between the outer surface of the corresponding outer race 28 and the corresponding trunnion 6, the rotation is smoothly performed. However, as described above, a force for changing the tilt angle of each of the displacement shafts 9 and 9 is small.

CITATION LIST

Patent Literature

Patent Literature 1: JP 2004-84712 A
Patent Literature 2: JP 2005-299752 A
Patent Literature 3: JP 2006-2791 A

SUMMARY OF INVENTION

Technical Problem

However, in the toroidal continuously variable transmission 1 described above, the driving shaft 72, the input shaft (variator shaft) 3, the thrust bearings 12, and the like are disposed so that their axes are positioned in alignment with each other.

However, in a case where the input side discs 4A and 4B, the output side disc 10, the variator shaft 3, the power rollers 11, and the like are assembled in advance into a module for a reduction in assembly cost, when a variator as the module is assembled into the casing 2, the axis of the casing 2 on which the variator shaft 3 is supported and the axis of the fitting hole 62b formed in the post 61 for fitting the thrust bearing 12 that supports the output side disc 10 deviate from each other, and there may be a case where bending stress is applied to the variator shaft 3 during rotation and an eccentric load is applied to each of the support parts (the thrust bearings 12, the bearing 73 provided in the casing, the driving shaft 72, and the like).

That is, since one end portion of the variator shaft 3 is connected to the driving shaft 72 and the other end portion thereof is rotatably supported by the bearing 73 mounted in a hole of the wall of the casing 2, the positional accuracy of the axis of the variator shaft 3 is determined by the positional accuracy of the bearing 73 and the driving shaft 72.

On the other hand, since the thrust bearing 12 that supports the output side disc 10 is fitted into the fitting hole 62b formed in the post 61, the positional accuracy thereof is determined by the positional accuracy of the fitting hole 62b.

Therefore, when the axis of the fitting hole 62b and the axis of the bearing 73 and the driving shaft 72 (the axis on which the variator shaft 3 is supported) deviate from each other, bending stress may be applied to the variator shaft 3 during rotation and an eccentric load may be applied to each of the support parts (the thrust bearings 12, the bearing 73 provided in the casing 2, the driving shaft 72, and the like).

The present invention has been made taking foregoing circumstances into consideration, and an object thereof is to provide a toroidal continuously variable transmission capable of preventing the application of bending stress to a variator shaft during rotation and the application of an eccentric load to each of support parts even when the axis of a fitting hole formed in a post and the axis on which the variator shaft is supported deviate from each other during the assembly of a variator as a module into a casing.

Solution to Problem

To achieve the above object, a toroidal continuously variable transmission of the present invention includes: a variator section which includes input side discs and an output side disc which are concentrically and rotatably supported by a variator shaft in a state where inner surfaces thereof oppose each other, and a plurality of power rollers which are provided between the input side discs and the output side disc and transmit rotational force of the input side discs to the output side disc at a predetermined gear ratio, the variator section being assembled into a casing; a post disposed perpendicular to the variator shaft; a thrust bearing which determines a position of the output side disc in an axial direction, rotatably supports the output side disc, and is fitted into a fitting hole provided in the post; and a predetermined gap provided between the thrust bearing and any one of the fitting hole and the output side disc in a direction perpendicular to the variator shaft.

In the configuration of the present invention, it is preferable that the predetermined gap be set to a size capable of absorbing misalignment between an axis of the variator shaft and an axis of the thrust bearing.

In addition, in the configuration of the present invention, it is preferable that one bearing ring of the thrust bearing be able to be aligned in the predetermined gap.

Advantageous Effects of Invention

According to the present invention, the predetermined gap is provided between the thrust bearing and at least any one of the fitting hole and the output side disc in the direction perpendicular to the variator shaft. Therefore, even when misalignment between the axis of the fitting hole formed in the post and the axis on which the variator shaft is supported occurs during the assembly of the variator as a module into the casing, the axes of the thrust bearing and the variator shaft can be aligned with each other in the predetermined gap, thereby preventing the application of bending stress to the variator shaft during rotation and the application of an eccentric load to each of support parts.

BRIEF DESCRIPTION OF DRAWINGS

FIG. 1 illustrates a toroidal continuously variable transmission of a first embodiment of the present invention, and is a sectional view thereof.

FIG. 2 is an enlarged sectional view of the main parts of the toroidal continuously variable transmission.

FIG. 3 illustrates a toroidal continuously variable transmission of a second embodiment of the present invention, and is an enlarged sectional view of the main parts thereof.

FIG. 4 illustrates an example of a toroidal continuously variable transmission which is hitherto known, and is a sectional view thereof.

FIG. 5 is an enlarged sectional view of the main parts of the toroidal continuously variable transmission.

FIG. 6 is a sectional view taken along line A-A of FIG. 4.

DESCRIPTION OF EMBODIMENTS

Hereinafter, embodiments of the present invention will be described with reference to the drawings.

First Embodiment

FIG. 1 is a sectional view of a toroidal continuously variable transmission according to the present embodiment and FIG. 2 is an enlarged sectional view of the main parts thereof. The toroidal continuously variable transmission illustrated in FIGS. 1 and 2 is different from the toroidal continuously variable transmission illustrated in FIGS. 4 to 6 in that a structure for preventing the application of bending stress to a variator shaft (input shaft) 3 during rotation and the application of an eccentric load to each of support parts is employed. Hereinafter, the difference will be described in detail, and like elements which are common are denoted by like reference numerals to omit or simplify the description thereof.

As illustrated in FIG. 1, a variator section 1A is assembled into a casing 2. The variator section 1A includes input side discs 4A and 4B and an output side disc 10 which are concentrically and rotatably supported by a variator shaft 3 in a state where their inner surfaces oppose each other, and a plurality of power rollers 11 (see FIG. 3) which are provided between the input side discs 4A and 4B and the output side disc 10 and transmit the rotational force of the input side discs 4A and 4B to the output side disc 10 at a predetermined gear ratio.

On the inside of the casing 2, a post 61 is disposed perpendicular to the input shaft (variator shaft) 3. The lower end portion of the post 61 is fastened and fixed to an upper cylinder body (body) 60 by a bolt 92. In addition, upper and lower yokes 23A and 23B are supported to oscillate by spherical posts 64 and 68 provided in the upper and lower sections of the post 61.

On the upper side of the post 61, the spherical post 64 in the upper end portion of the post 61 is fastened and fixed to a connection plate 65 by a bolt 93.

In the toroidal continuously variable transmission, after the variator section 1A illustrated in FIG. 1 is assembled, the assembled variator section 1A is accommodated in the casing 2 and one end portion of the input shaft (variator shaft) 3 is connected to a driving shaft 72 while the other end portion thereof is rotatably supported by a bearing 73.

In the center portion of the post 61, an insertion hole 62 is formed as illustrated in FIG. 2. The insertion hole 62 includes a large-diameter hole 62a and a fitting hole 62b which has a smaller diameter than that of the large-diameter hole 62a.

In addition, the thrust bearing 12 is inserted into the insertion hole 62, one bearing ring 12a of the thrust bearing 12 is fitted into the fitting hole 62b, and the other bearing ring 12b is inserted into the large-diameter hole 62a. An end portion 10b of the output side disc 10 is inserted into the large-diameter hole 62a of the insertion hole 62, and the other bearing ring 12b of the thrust bearing 12 is fitted to the end portion 10b.

The thrust bearing 12 includes the pair of left and right bearing rings 12a and 12b.

The bearing ring 12a has a ring shape with an L-shaped transverse section, and includes an annular ring portion 12a1 and a flange portion 12a2 formed at the outer peripheral portion of the ring portion 12a1.

Similarly to the bearing ring 12a, the bearing ring 12b has a ring shape with an L-shaped transverse section, and includes an annular ring portion 12b1 and a flange portion 12b2 formed at the outer peripheral portion of the ring portion 12b1.

The flange portion 12a2 and the flange portion 12b2 have the same shape while the ring portion 12a1 is thinner than the ring portion 12b1.

The ring portion 12a1 is fitted into the fitting hole 62b. However, a predetermined gap S is provided between the outer peripheral surface of the ring portion 12a1 and the inner peripheral surface of the fitting hole 62b in a direction perpendicular to the input shaft (variator shaft) 3. Accordingly, the predetermined gap S is provided between the thrust bearing 12 and the fitting hole 62b in the direction perpendicular to the input shaft (variator shaft) 3.

The predetermined gap S is set to a size such that misalignment between the axis of the input shaft (variator shaft) 3 and the axis of the thrust bearing 12 can be absorbed. That is, one bearing ring 12a of the thrust bearing 12 can be slightly moved in a vertical direction in FIG. 2 in the predetermined gap S for alignment.

As described above, since one bearing ring 12a can be slightly moved in the vertical direction, the thrust bearing 12 can be slightly moved in the vertical direction in the gap S along with the output side disc 10 and the input shaft 3. Therefore, the axes of the thrust bearing 12 and the input shaft 3 can be aligned with each other.

In addition, a spacer 13 is interposed between the flange portion 12a2 and the bottom surface of the large-diameter hole 62a.

The outer peripheral surface of the ring portion 12b1 of the other bearing ring 12b of the thrust bearing 12 abuts the inner peripheral surface of the end portion 10b of the output side disc 10, and the flange portion 12b2 abuts the end portion 10b. Accordingly, the other bearing ring 12b of the thrust bearing 12 is fitted to the end portion 10b.

In this embodiment, since the predetermined gap S is provided between the thrust bearing 12 and the fitting hole 62b formed in the post 61 in the direction perpendicular to the input shaft (variator shaft) 3, even when misalignment between the axis of the fitting hole 62b formed in the post 61 and the axis on which the input shaft (variator shaft) 3 is supported (the axis of the bearing 73 and the driving shaft 72) occurs during the assembly of the variator 1A as a module into the casing 2, the axes of the thrust bearing 12 and the input shaft (variator shaft) 3 can be aligned with each other in the predetermined gap S. Therefore, the application of bending stress to the input shaft (variator shaft) 3 during rotation and the application of an eccentric load to each of the support parts (the thrust bearings 12, the bearing 73 provided in the casing, the driving shaft 72, and the like) can be prevented.

Second Embodiment

FIG. 3 illustrates a second embodiment and is a sectional view of main parts. The difference between a toroidal continuously variable transmission illustrated in this figure and the first embodiment illustrated in FIGS. 1 and 2 is the position where the predetermined gap S is provided. Hereinafter, the difference is described, and like elements which are common to those of the first embodiment are denoted by like reference numerals to omit or simplify the description thereof.

In this embodiment, the thrust bearing 12 is reversed from left to right for use. That is, one bearing ring 12a is disposed on the left side, and the other bearing ring 12b is disposed on the right side.

In this thrust bearing 12, the ring portion 12a1 is fitted to the inner peripheral surface of the end portion 10b of the output side disc 10, and the predetermined gap S is provided between the outer peripheral surface of the ring portion 12a1 and the inner peripheral surface of the end portion 10b in the direction perpendicular to the input shaft (variator shaft) 3. Accordingly, the predetermined gap S is provided between the thrust bearing 12 and the output side disc 10 in the direction perpendicular to the input shaft (variator shaft) 3.

The predetermined gap S is set to a size such that misalignment between the axis of the input shaft (variator shaft) 3 and the axis of the thrust bearing 12 can be absorbed. That is, the output side disc 10 can be slightly moved in the vertical direction in FIG. 2 in the predetermined gap S with respect to one bearing ring 12a of the thrust bearing 12 for alignment.

As described above, since the output side disc 10 can be slightly moved in the vertical direction with respect to one bearing ring 12a, the output side disc 10 and the input shaft 3 can be slightly moved in the vertical direction in the gap S. Therefore, the axes of the thrust bearing 12 and the input shaft 3 can be aligned with each other.

In addition, the outer peripheral surface of the ring portion 12b1 of the other bearing ring 12b of the thrust bearing 12 abuts the inner peripheral surface of the fitting hole 62b, and the flange portion 12b2 abuts the bottom surface of the large-diameter hole 62a of the insertion hole 62 via the spacer 13. Accordingly, the other bearing ring 12b of the thrust bearing 12 is fitted into the fitting hole 62b.

In this embodiment, since the predetermined gap S is provided between the thrust bearing 12 and the output side disc 10 in the direction perpendicular to the input shaft (variator shaft) 3, even when misalignment between the axis of the fitting hole 62b formed in the post 61 and the axis on which the input shaft (variator shaft) 3 is supported (the axis of the bearing 73 and the driving shaft 72) occurs during the assembly of the variator section 1A as a module into the casing 2, the axes of the thrust bearing 12 and the input shaft (variator shaft) 3 can be aligned with each other in the predetermined gap S. Therefore, the application of bending stress to the input shaft (variator shaft) 3 during rotation and the application of an eccentric load to each of the support parts (the thrust bearings 12, the bearing 73 provided in the casing, the driving shaft 72, and the like) can be prevented.

In the embodiments described above, the predetermined gap S is provided between the thrust bearing 12 and any of the fitting hole 62b and the output side disc 10 in the direction perpendicular to the variator shaft. However, the gap S may also be provided between the thrust bearing 12 and both of the fitting hole 62b and the output side disc 10.

REFERENCE SIGNS LIST 1 toroidal continuously variable transmission
1A variator section
2 casing
3 input shaft
4A, 4B input side disc
10 output side disc
11 power roller
12 thrust bearing
61 post
62b fitting hole
72 driving shaft
73 bearing

The invention claimed is:

1. A toroidal continuously variable transmission comprising:
a variator section which includes input side discs and an output side disc which are concentrically and rotatably supported by a variator shaft in a state where inner surfaces thereof oppose each other, and a plurality of power rollers which are provided between the input side discs and the output side disc and transmit rotational force of the input side discs to the output side disc at a predetermined gear ratio, the variator section being assembled into a casing;
a post disposed perpendicular to the variator shaft;
a thrust bearing which determines a position of the output side disc in an axial direction, rotatably supports the output side disc, and is fitted into a fitting hole provided in the post; and
a predetermined gap provided between the thrust bearing and at least any one of the fitting hole and the output side disc in a direction perpendicular to the variator shaft,
wherein one bearing ring of the thrust bearing is configured to be movable in the predetermined gap in the direction perpendicular to the variator shaft.

2. The toroidal continuously variable transmission according to claim 1,
wherein the predetermined gap is set to a size capable of absorbing misalignment between an axis of the variator shaft and an axis of the thrust hearing.

3. The toroidal continuously variable transmission according to claim 2,
wherein one bearing ring of the thrust bearing is able to be aligned in the predetermined gap.

4. The toroidal continuously variable transmission according to claim 1,
wherein one bearing ring of the thrust bearing is able to be aligned in the predetermined gap.

* * * * *